United States Patent
Kaserer et al.

(10) Patent No.: US 11,396,278 B2
(45) Date of Patent: Jul. 26, 2022

(54) MASTER BRAKE CYLINDER FOR A HYDRAULIC VEHICLE BRAKE SYSTEM

(71) Applicant: Robert Bosch GmbH, Stuttgart (DE)

(72) Inventors: Stefan Kaserer, Ofterschwang (DE); Andreas Weh, Sulzberg (DE); Matthias Mayr, Rettenberg (DE)

(73) Assignee: Robert Bosch GmbH, Stuttgart (DE)

( * ) Notice: Subject to any disclaimer, the term of this patent is extended or adjusted under 35 U.S.C. 154(b) by 202 days.

(21) Appl. No.: 16/629,827

(22) PCT Filed: Jun. 14, 2018

(86) PCT No.: PCT/EP2018/065793
§ 371 (c)(1),
(2) Date: Jan. 9, 2020

(87) PCT Pub. No.: WO2019/011573
PCT Pub. Date: Jan. 17, 2019

(65) Prior Publication Data
US 2021/0086730 A1      Mar. 25, 2021

(30) Foreign Application Priority Data

Jul. 12, 2017   (DE) .......................... 102017211872.5

(51) Int. Cl.
*B60T 11/20* (2006.01)
*B60T 7/04* (2006.01)
(Continued)

(52) U.S. Cl.
CPC ............ *B60T 7/042* (2013.01); *B60T 8/4081* (2013.01); *B60T 8/38* (2013.01); *B60T 11/16* (2013.01);
(Continued)

(58) Field of Classification Search
CPC ...... B60T 11/165; B60T 11/20; B60T 13/745; F15B 7/08
(Continued)

(56) References Cited

U.S. PATENT DOCUMENTS 3,802,199 A * 4/1974 Hagberg, Jr. ......... B60T 11/165
                                                       60/574
4,996,843 A * 3/1991 Levrai .................... B60T 11/20
                                                       60/562
(Continued)

FOREIGN PATENT DOCUMENTS

CN      102481916 A    5/2012
CN      104203681 A    12/2014
(Continued)

OTHER PUBLICATIONS

International Search Report for PCT/EP2018/065793, dated Oct. 5, 2018.

*Primary Examiner* — Bradley T King
(74) *Attorney, Agent, or Firm* — Norton Rose Fulbright US LLP; Gerard Messina (57) ABSTRACT

A hydraulic block of a slip regulation system of a hydraulic external force vehicle brake system that has a master brake cylinder bore and forms a master brake cylinder. In order to prevent a hard impact of a master brake cylinder piston on an end stop when the master brake cylinder is released, in particular when there is a sudden release, for example when the driver's foot slips off the brake pedal, the present invention provides a hydraulic return flow damper that is integrated in the master brake cylinder piston.

9 Claims, 4 Drawing Sheets

(51) Int. Cl.
  *B60T 8/40* (2006.01)
  *B60T 8/38* (2006.01)
  *B60T 11/16* (2006.01)
  *B60T 13/68* (2006.01)
  *B60T 17/22* (2006.01)

(52) U.S. Cl.
  CPC .......... *B60T 13/686* (2013.01); *B60T 17/221* (2013.01); *B60Y 2400/81* (2013.01)

(58) Field of Classification Search
  USPC .......................................................... 60/562
  See application file for complete search history.

(56) References Cited

U.S. PATENT DOCUMENTS

| | | | | |
|---|---|---|---|---|
| 5,086,688 | A * | 2/1992 | Kervagoret | .......... B60T 13/141 |
| | | | | 60/533 |
| 6,014,862 | A | 1/2000 | Shaw et al. | |
| 6,347,518 | B1 * | 2/2002 | Kingston | ................ B60T 7/042 |
| | | | | 60/552 |
| 2003/0178262 | A1 | 9/2003 | Pietsch et al. | |
| 2007/0289827 | A1 | 12/2007 | Isono | |
| 2011/0297493 | A1 * | 12/2011 | Vollert | .................. B60T 13/575 |
| | | | | 188/106 R |
| 2015/0283986 | A1 * | 10/2015 | Grace | ..................... B60T 8/449 |
| | | | | 60/591 |
| 2018/0056957 | A1 * | 3/2018 | Foerch | .................. B60T 13/143 |
| 2018/0345933 | A1 * | 12/2018 | Weh | ....................... B60T 17/221 |
| 2020/0017091 | A1 * | 1/2020 | Bischoff | ................ F15B 15/226 |
| 2020/0290584 | A1 * | 9/2020 | Naka | ...................... B60T 13/00 |

FOREIGN PATENT DOCUMENTS

| | | |
|---|---|---|
| CN | 104245452 A | 12/2014 |
| CN | 105313706 A | 2/2016 |
| CN | 106740777 A | 5/2017 |
| DE | 4202217 A1 | 7/1993 |
| DE | 4423562 C1 | 9/1995 |
| DE | 19813494 A1 | 10/1999 |
| EP | 1350702 A1 | 10/2003 |

* cited by examiner

MASTER BRAKE CYLINDER FOR A HYDRAULIC VEHICLE BRAKE SYSTEM

FIELD OF THE INVENTION

The present invention relates to a master brake cylinder for a hydraulic vehicle brake system having the features of the preamble of claim 1.

BACKGROUND INFORMATION

Master brake cylinders are known; they have a so-called primary or rod piston that is axially displaceable in a master brake cylinder bore of the master brake cylinder, immediately or indirectly, using a (foot) brake pedal or a (hand) brake lever. This means that for an actuation of the master brake cylinder and a connected hydraulic vehicle brake system, the piston is mechanically displaced in a direction of actuation in the master brake cylinder bore, using muscular force or auxiliary force. Auxiliary force actuation refers to a displacement by muscular force amplified by a brake booster. A return movement of the piston, in the opposite direction, normally takes place via a piston spring that is tensioned when the piston is displaced in the direction of actuation and loads the piston in a direction of a return movement.

SUMMARY OF THE INVENTION

The master brake cylinder according to the present invention, having the features described herein, is provided for a hydraulic external force vehicle brake system having slip regulation. It has a master brake cylinder bore in which a master brake cylinder piston is axially displaceable. This master brake cylinder piston is in particular a so-called rod piston or primary piston that, for an actuation of the master brake cylinder and a connected hydraulic vehicle brake system, is mechanically displaced via a piston rod by a brake pedal (or a hand brake lever) and, possibly, a brake booster, in a direction of actuation in the master brake cylinder bore. The designation as "bore" does not mean that the master brake cylinder bore has to be produced by boring; rather, it can also be produced in some other way, by machining or without machining.

The master brake cylinder according to the present invention has an in particular hydraulic return flow damper for the master brake cylinder piston, which dampens a return movement of the master brake cylinder piston in a return direction of movement, opposite the direction of actuation, i.e. in the direction of an unactuated position of the master brake cylinder piston, so that the master brake cylinder does not make a hard impact against an end stop that limits the return movement of the master brake cylinder piston and defines the unactuated position of the master brake cylinder piston. The present invention prevents damage to sensors and malfunctioning of a brake regulation or control electronics system, which could falsely recognize a desired braking on the part of a vehicle driver when there is a hard impact of a master brake cylinder piston against an end stop.

The return flow damper has a return flow damper cylinder and a return flow damper piston in the return flow damper cylinder, which divides the return flow damper cylinder into two chambers. The return flow damper cylinder is connected to the master brake cylinder piston, so that the return flow damper cylinder moves with the master brake cylinder piston. The return flow damper piston is connected to the master brake cylinder or to a further master brake cylinder piston, so that, when there is an actuation of the master brake cylinder, it does not move with the one master brake cylinder piston; rather, the return flow damper piston moves in the return flow damper cylinder. The additional master brake cylinder piston is in particular a so-called floating piston or secondary piston that is hydraulically displaced by a pressure in the master brake cylinder bore that the one master brake cylinder piston produces during its displacement in the direction of actuation in the master brake cylinder bore. The floating or secondary piston moves only a short distance when there is an external force actuation of a vehicle brake system, and then remains stationary, so that the return flow damper piston also moves only a short distance, and is subsequently displaced relative to the return flow damper cylinder, in this cylinder. Conversely, the return flow damper piston can also be connected to the master brake cylinder piston and can move with it, and the return flow damper cylinder can be connected to the master brake cylinder or to the further master brake cylinder piston in order not to move therewith, but rather to move relative to the return flow damper piston in order to produce the relative movement of the return flow damper piston in the return flow damper cylinder during the actuation and release of the master brake cylinder.

A displacement of the return flow damper piston relative to the return flow damper cylinder changes, in opposite directions, the volumes of the two chambers into which the return flow damper piston divides the return flow damper cylinder. The return flow damper has a first check valve through which brake fluid can flow from one of the two chambers, which becomes smaller when there is an actuation of the master brake cylinder, into another of the two chambers, which becomes larger when there is an actuation of the master brake cylinder. The first check valve has a large flow cross-section, so that it throttles the flow only to a small extent and brakes the movement of the master brake cylinder piston only to a small extent.

The return movement of the master brake cylinder piston is damped in that brake fluid from the other chamber of the return damper cylinder, which becomes smaller during the return movement of the master brake cylinder piston, flows out while being throttled. For the throttling, the return flow damper has a spring-loaded second check valve through which the brake fluid can flow from the other chamber of the return flow damper cylinder into the master brake cylinder. The second check valve has a small flow cross-section, or in any case has a greater flow resistance than the first check valve. In addition, a flow through the second check valve is throttled by a spring loading of its blocking element, which has to be lifted off from a valve seat, against its spring loading, for the flow through to occur. The second check valve forms a dynamic throttle having a nearly constant flow resistance that is largely independent of the viscosity of the brake fluid. As a result, the damping of the return movement of the master brake cylinder piston is largely independent of temperature. The damping of the return movement of the master brake cylinder piston can be adapted to particular circumstances and tasks through the selection of a spring hardness, or spring characteristic, of the spring loading of the blocking element of the second check valve, a stroke of the blocking element, and/or a flow cross-section.

A spring rigidity and a pre-tensioning of a valve closing spring of the second check valve determine an opening pressure and a flow resistance of the second check valve, and thus determine a hysteresis of the master brake cylinder, i.e. a different characteristic when the master brake cylinder is actuated and when it is released. If a flutter valve is used as second check valve, having a leaf spring as blocking element and a valve closing spring, their bending rigidity, pretension, and the distance of their fastening from a valve passage determine the opening pressure and the flow resistance. The leaf spring does not have to be straight, but rather can for example be a perforated disk.

Brake fluid flows from the master brake cylinder bore, which may be with a low flow resistance, through one or more large openings into the one chamber of the return flow damper cylinder, which becomes larger during the return movement of the master brake cylinder piston.

The further embodiments have as their subject matter advantageous embodiments and developments of the further descriptions herein.

In particular, the master brake cylinder is provided as a hydraulic block of a brake regulation system of a hydraulic vehicle brake system, in particular an external force vehicle brake system. Brake regulation is to be understood in particular as slip regulation, such as an anti-lock system, an anti-slip system, and/or a driving dynamic regulation/electronic stability program, standardly abbreviated as ABS, ASR, FDR/ESP. Such slip regulation systems of hydraulic vehicle brake systems are known from passenger vehicles and motorcycles and are not explained in more detail here. A brake regulation system is for example also a regulation (or controlling) of a wheel brake pressure and of a braking force of an external or auxiliary force brake system. In this case, the master brake cylinder according to the present invention is a hydraulic block having the master brake cylinder bore and having receptacles for hydraulic components of the brake regulation, such as magnetic valves, return valves, hydraulic pumps, hydraulic storage units, damper chambers, and, in the case of an external force brake system, possibly an external force cylinder bore for a production of brake pressure by external force. In addition, the hydraulic block has connections for brake lines that lead to hydraulic wheel brakes of the vehicle brake system.

In the following, the present invention is explained in more detail on the basis of a specific embodiment shown in the drawings.

The drawing is a simplified, schematic representation, for the explanation and understanding of the present invention.

DETAILED DESCRIPTION

Figure 2:
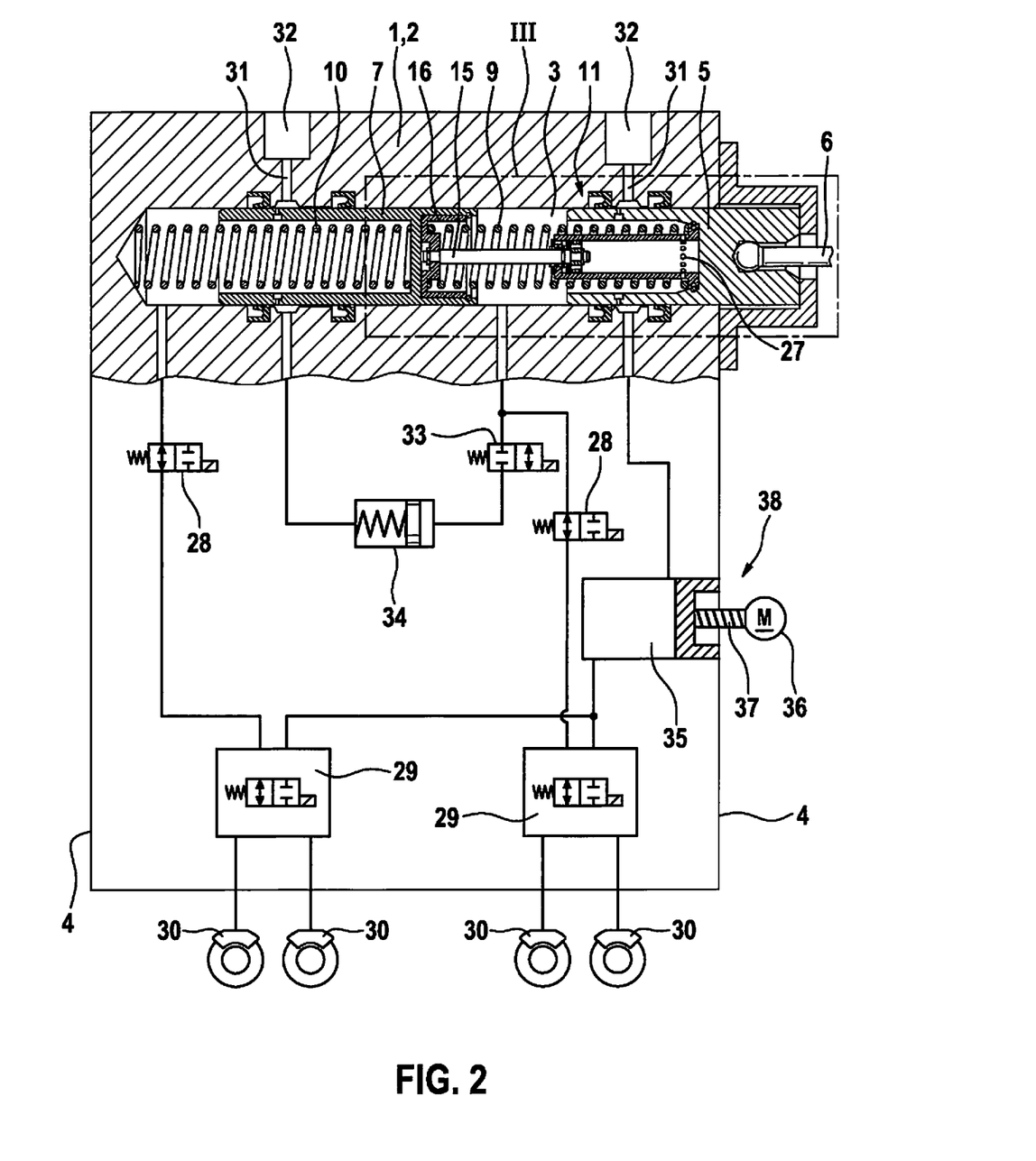
FIG. 2 shows a master brake cylinder according to the present invention, in partial section in a midplane, in the region of a master brake cylinder bore.

Master brake cylinder 1 according to the present invention, shown in FIG. 2, is realized as hydraulic block 2 of a hydraulic external force vehicle brake system having slip regulation. Slip regulation systems are for example anti-lock systems, anti-slip systems, and/or driving dynamic regulation/electronic stability programs, standardly abbreviated ABS, ASR, FDR/ESP. Hydraulic block 2 is a cuboidal metal block that is somewhat longer than it is wide, and is a multiple wider than it is thick. FIG. 2 shows hydraulic block 2 in a view of one of its two large sides, and is shown in section in the region of a master brake cylinder bore 3. A sectional plane is situated in a midplane between the two large sides of hydraulic block 2, and is at the same time an axial plane of master brake cylinder bore 3. In the exemplary embodiment, master brake cylinder bore 3 is a blind hole, a blind hole sealed at one end also being possible.

In master brake cylinder bore 3, a master brake cylinder piston 5 is accommodated in an axially displaceable manner, and can be mechanically displaced axially in master brake cylinder bore 3 via a piston rod 6. Piston rod 6 is connected in a jointed manner to a foot brake pedal 42 or handbrake lever shown in FIG. 1, so that master brake cylinder piston 5 can be displaced by muscular or auxiliary force. Auxiliary force means displacement by muscular force reinforced by a brake booster. Master brake cylinder piston 5 is also referred to in the following as primary piston or rod piston.

In master brake cylinder bore 3, at a side of the one master brake cylinder piston 5 facing away from piston rod 6, a further master brake cylinder 7 is axially displaceably accommodated that is displaced in master brake cylinder bore 3 by a hydraulic pressure produced by the one master brake cylinder piston 5 when it is displaced in a direction of actuation in master brake cylinder bore 30 for actuation of master brake cylinder 1 and of the hydraulic vehicle brake system. The direction of actuation is oriented away from piston rod 6 and in the direction of further master brake cylinder piston 7. In the following, further master brake cylinder piston 7 is also referred to as secondary or floating piston. When only one master brake cylinder piston is being discussed, the one master brake cylinder piston 5, i.e. the primary or rod piston, is meant. The two master brake cylinder pistons 5, 7 are supported on one another via a helical pressure spring as piston spring 9, and further master brake cylinder piston 7 is supported via a helical pressure spring as piston spring 10 on a floor of master brake cylinder bore 3, realized as a blind hole.

Figure 3:
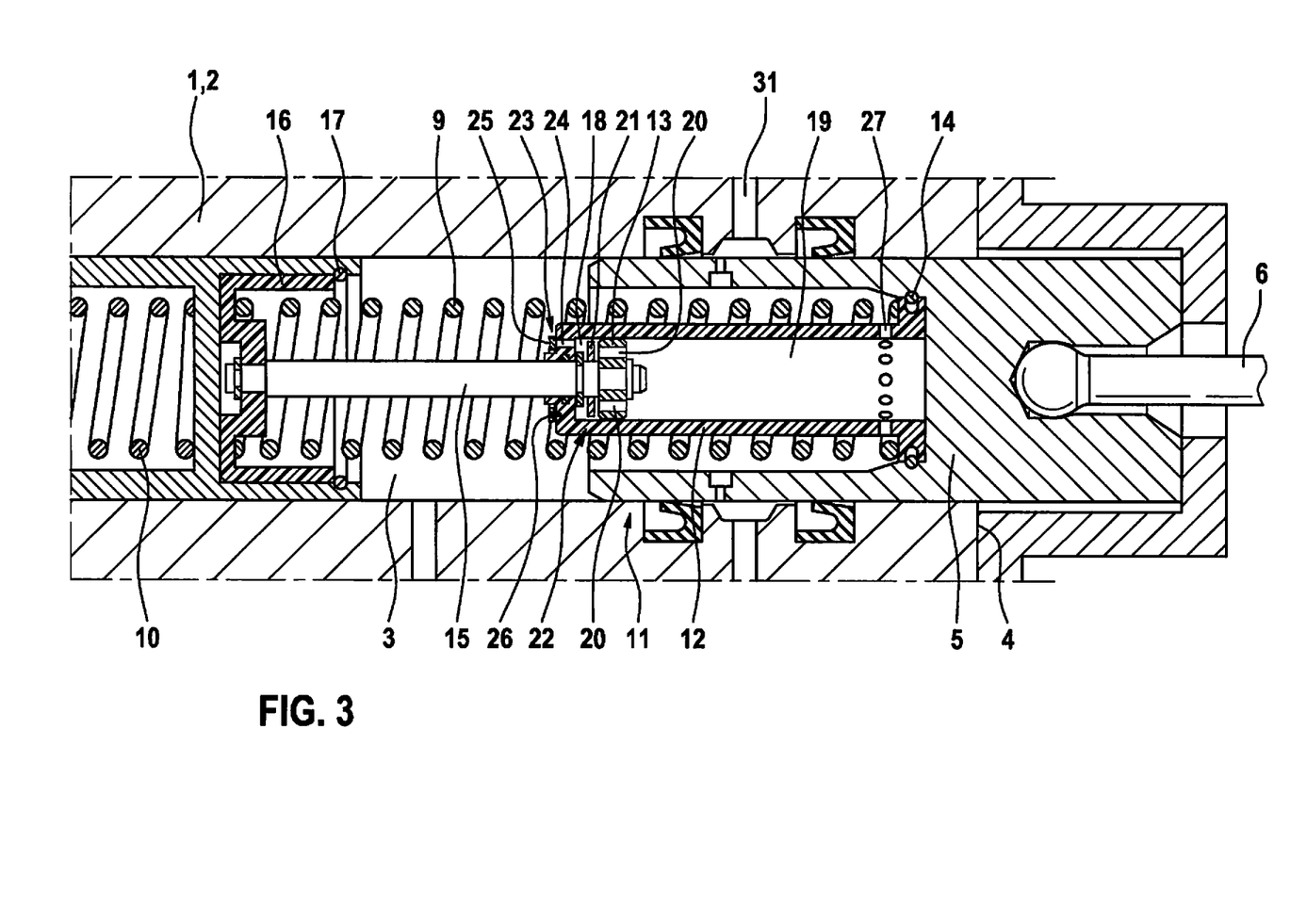
FIG. 3 shows an enlarged detail according to rectangle III in FIG. 2.

The one master brake cylinder piston 5 is realized as a hollow piston, and a hydraulic return flow damper 11 is integrated in it, which can be seen more clearly in the enlarged representation of FIG. 3. Return flow damper 11 has a return flow damper cylinder 12 in which a disk-shaped return flow damper piston 13 is axially displaceably situated. Return flow damper cylinder 12 is held in master brake cylinder piston 5 by a securing ring 14 that engages in circumferential grooves in master brake cylinder piston 5 and in return flow damper cylinder 12.

Return flow damper piston 13 is situated in an axially fixed manner on a piston rod 15 that is connected in an axially fixed manner to the further master brake cylinder piston 7. In the depicted and described specific embodiment of the present invention, piston rod 15 is fastened with a bowl-shaped rod mount 16 in a recess on the end face of the further master brake cylinder piston 7, which is held in the recess by a securing ring 17 that engages in a circumferential groove in further master brake cylinder piston 7. The fastenings of return flow damper cylinder 12 in the one master brake cylinder piston 5 and of piston rod 15 in rod mount 16 have some radial play, so that return flow damper 11, which connects the two master brake cylinder pistons 5, 7 to one another, does not prevent a radial movement and tilting of the two master brake cylinder pistons 5, 7 relative to one another. Master brake cylinder bore 3 orients the two master brake cylinder pistons 5, 7 so as to align with one another, and return flow damper 11 does not cause an overdetermination.

Return flow damper piston 13 in return flow damper cylinder 12 of return flow damper 11 divides an interior compartment of return flow damper cylinder 12 into two chambers 18, 19. When the two master brake cylinder pistons 5, 7 move axially relative to one another, return flow damper piston 13 is displaced in return flow damper cylinder 12, causing the volumes of the two chambers 18, 19 to change in opposite directions. This means that one of the two chambers 18, 19 becomes larger and the other chamber 19, 18 becomes smaller. Return flow damper piston 13 has openings 20 configured around piston rod 15, through which brake fluid flows from the one chamber 18, 19 into the other chamber 19, 18 when return flow damper piston 13 moves in return flow damper cylinder 12. A perforated disk having a center perforation and not having eccentric perforations is situated on a side of return flow damper piston 13 facing the further master brake cylinder piston 7, as blocking element 21 of a plate valve, which in general can also be understood as first check valve 22.

When return flow damper piston 13 moves in return flow damper cylinder 12 in the direction of the further master brake cylinder piston 7, blocking element 21 blocks the openings 20, so that no brake fluid can flow from the one chamber 18 into the other chamber 19 of return flow damper 11. When return flow damper piston 13 of return flow damper 11 moves in the opposite direction, blocking element 21 lifts off from return flow damper piston 13 and releases openings 20, so that brake fluid can flow from the other chamber 19 into the one chamber 18.

Figure 4:
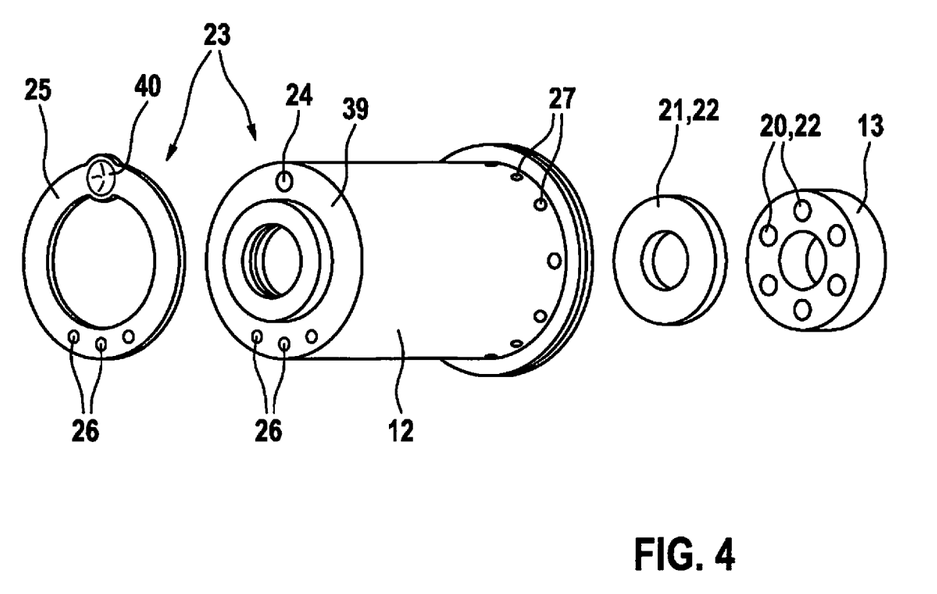
FIG. 4 shows parts of a hydraulic return flow damper of the master brake cylinder of FIG. 2, in a perspective exploded view.

A chamber 18 facing the further master brake cylinder piston 7 in return flow damper cylinder 12 has a flutter valve as second check valve 23, whose individual parts are shown in FIG. 4. Second check valve 23 is spring-loaded, differing from first check valve 22, which does not have a spring in this exemplary embodiment. It has an axially parallel through-hole as valve opening 24 in an end wall 39 of return flow damper cylinder 12, at its end facing the other master brake cylinder piston 7, which hole is covered by a spring-loaded perforated disk, as blocking element 25, of second check valve 23, on an external side, facing the other master brake cylinder piston 7, of end wall 39 of return flow damper cylinder 12. When, upon a return movement of master brake cylinder piston 5, return flow damper piston 13 reduces the volume of the one chamber 18 in return flow damper cylinder 12, it impels brake fluid through second check valve 23, from the one chamber 18 in return flow damper cylinder 12 into master brake cylinder bore 3. During this, the flowing brake fluid lifts the spring-loaded perforated disk, which forms blocking element 25, off from valve opening 24 in end wall 39 of return flow damper cylinder 13.

Valve opening 24, and the spring-loaded perforated disk acting at the same time as a valve closing spring forming blocking element 25 of second check valve 23 formed as a flutter valve, throttle the flow so that second check valve 23 at the same time also forms a throttle. As a result of the configuration, a flow resistance of second check valve 23 is only slightly affected by a viscosity of the brake fluid, and is thus only slightly affected by the temperature. Second check valve 23 can also be understood as a dynamic throttle. Due to the number of its openings 20, a flow resistance of first check valve 22 is only a fraction of the flow resistance of second check valve 23.

For the tight sealing of valve opening 24 in end wall 39 of return flow damper cylinder 12, the perforated disk forming blocking element 25 of second check valve 23 has a raised part 40, in the shape of a hollow spherical cap, at the location at which valve opening 24 is situated, curved convexly in the direction of end wall 39 of return flow damper cylinder 12. When second check valve 23 is closed, raised part 40 lies against a closed circular line at an exit opening of valve opening 24 that forms a valve seat of second check valve 23.

The spring-loaded perforated disk forming blocking element 25 of second check valve 23 configured as a flutter valve is fastened, opposite valve opening 24 in end wall 39 of return flow damper cylinder 12, by three welding points 26 whose position is shown in FIG. 4, on end wall 39 of return flow damper cylinder 12. Other types of fastening are possible. A distance of the fastening of the perforated plate forming blocking element 25 from valve opening 24 in the circumferential direction, a pre-tensioning, and a spring hardness, or bending strength, of blocking element 25 determine an opening pressure of the second check valve, configured as a flutter valve, and determine a spring hardness of the perforated plate forming its valve closing spring, and thus determine an opening resistance and a flow resistance of second check valve 23. If blocking element 25 is fastened closer to valve opening 24, then second check valve 23 throttles more strongly. The opening resistance and the flow resistance of second check valve 23 are thus capable of being determined through the position of the weld points 26 by which the perforated disk forming blocking element 25 is situated on end wall 39 of return flow damper cylinder 12 relative to valve opening 24. The realization of second check valve 23 as a flutter valve is not required for the present invention; other spring-loaded check valves are also possible. The pre-tension is a force with which the perforated disk forming blocking element 25 of second check valve 23 lies, in a spring-elastic manner, on valve opening 24 when master brake cylinder 1 is without pressure.

The perforated disk can in general also be understood as a leaf spring that forms blocking element 23 and the valve closing spring of second check valve 23, formed as a flutter valve, of return flow damper 11 of master brake cylinder 1 according to the present invention. A distance at which the leaf spring is fastened from valve opening 24, as well as a bending strength and a pre-tension of the leaf spring, determine the opening pressure of second check valve 23 and the spring hardness of its valve closing spring, and thus determine an opening resistance and a flow resistance of second check valve 23.

Figure 1:
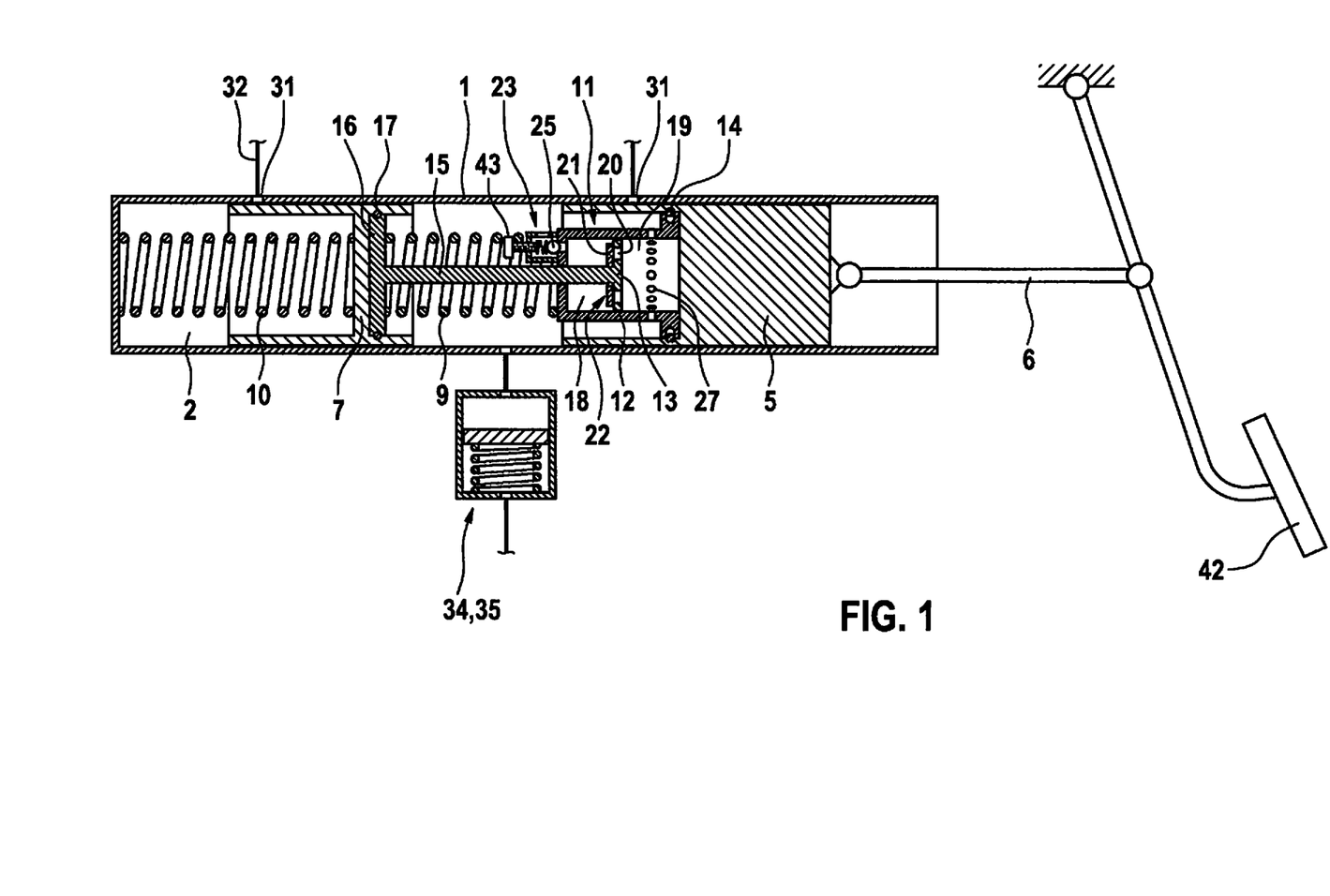
FIG. 1 shows a schematic representation of a master brake cylinder according to the present invention having a return flow damper.

In the schematic representation of FIG. 1, spring-loaded second return valve 23 is shown, having a ball as blocking element that is pressed by a helical spring, as valve closing spring, against a valve seat at a valve opening in the end wall of return flow damper cylinder 12. Flow can take place from the one chamber 18 of return flow damper cylinder 12 through second check valve 23 into master brake cylinder bore 2. A screw 43, shown symbolically, represents the adjustability of a pre-tension with which the valve closing spring presses the blocking element of second check valve 23 against the valve seat. In the specific embodiment of master brake cylinder 1 according to the present invention, shown in FIGS. 2 through 4, the pre-tension is achieved through a bending of the perforated disk forming blocking element 25 and forming the valve closing spring of second check valve 23, perpendicular to end wall 39 of return flow damper cylinder 12. The pre-tension of the valve closing spring determines an opening pressure of second check valve 23. As stated, the pre-tension, a bending strength of the perforated disk, or a spring rigidity, and a length of the valve closing spring determine the opening pressure and the flow resistance, and thus determine a characteristic of second check valve 23, a characteristic and a hysteresis of return flow damper 11, and the hysteresis of master brake cylinder 1, i.e. a different characteristic during actuation and during release of master brake cylinder 1. An actuation of master brake cylinder 1 is damped only slightly, whereas return flow damper 11 dampens the release significantly more strongly. The dampening during the release of master brake cylinder 1 and the hysteresis can be adjusted with second check valve 23.

The other chamber 19 in return flow damper cylinder 12, which becomes larger during the return movement of master brake cylinder piston 5, has radial bores 27, distributed around a circumference, at an end remote from further master brake cylinder piston 7, through which bores brake fluid can flow from master brake cylinder bore 3 into the other chamber 19 with a low flow resistance.

Master brake cylinder bore 3 communicates, through a separating valve 28 (FIG. 2) between the two master brake cylinder pistons 5, 7 and through a separating valve 28 between the further master brake cylinder piston 7 and the base of master brake cylinder bore 3 and through wheel brake pressure modulation valve systems 29, with hydraulic wheel brakes 30, which are connected to hydraulic block 2 by brake lines, which block forms master brake cylinder 1. Moreover, master brake cylinder bore 3 communicates, through holes 31, with connections 32 for a brake fluid supply reservoir (not shown). Master brake cylinder pistons 5, 7 form sliding valves that close holes 31 when they are displaced from their depicted, non-actuated positions in a direction of actuation. Master brake cylinder 1 is a two-circuit master brake cylinder, to which wheel brakes 30 are connected so as to be partitioned into two brake circuits, hydraulically separated from one another.

A cylinder-piston unit, having a spring-loaded piston, and forming a pedal path simulator 34, is connected to master brake cylinder bore 3 between the two master brake cylinder pistons 5, 7, by a simulator valve 33. A side of pedal path simulator 34 facing away from simulator valve 33 communicates, through a relief bore, with one of the connections 32 for the brake fluid supply reservoir.

In order to produce brake pressure during service braking with external force, hydraulic block 2 has a cylinder-piston unit 35 whose piston can be displaced by an electric motor 36 via a screw drive 37. This cylinder-piston unit 35, with electric motor 36 and screw drive 37, is here designated external force pressure producer 38. External force pressure producer 38 receives brake fluid from the brake fluid supply reservoir (not shown) through one of the connections 32, and the hydraulic wheel brakes 30 are connected to external force pressure producer 38 via wheel brake pressure modulation valve systems 29.

For a service braking, the one master brake cylinder piston 5 of master brake cylinder 1, i.e. the so-called primary piston or rod piston, is displaced by muscular force by pressing down the brake foot pedal (not shown), and is mechanically displaced via piston rod 6 in a direction of actuation, i.e. in the direction of the floor of master brake cylinder bore 3. The other master brake cylinder piston 7, i.e. the secondary or floating piston, is also displaced in master brake cylinder bore 3 by brake fluid in master brake cylinder bore 3, between the two master brake cylinder pistons 5, 7, or via piston spring 9 between the two master brake cylinder pistons 5, 7. Both master brake cylinder pistons 5, 7 travel past holes 31, and thereby hydraulically separate master brake cylinder bore 3 from the pressureless brake fluid supply reservoir (not shown). At the beginning of the pushing down of the brake pedal, or the displacement of one of the master brake cylinder pistons 5, 7, separating valves 28 are closed so that no brake fluid can be impelled from master brake cylinder bore 3 in the direction of wheel brakes 30, and simulator valve 33 is opened, so that pedal path simulator 34 communicates with master brake cylinder bore 3 between the two master brake cylinder pistons 5, 7.

Because the further master brake cylinder piston 7 can no longer impel brake fluid out of master brake cylinder bore 3, due to closed separating valve 28, master brake cylinder piston 7 does not move further; rather, when the brake pedal is further depressed, only the one master brake cylinder 5 moves and impels brake fluid from master brake cylinder bore 3 into pedal path simulator 34. A hydraulic brake pressure is produced by external force pressure producer 38, and wheel brake pressures in wheel brakes 30 are controlled or regulated as a function of a displacement of the one master brake cylinder piston 5 in master brake cylinder 1, by external force pressure producer 38 and/or wheel brake pressure modulation valve systems 29, which can be understood as brake regulation.

Return flow damper cylinder 12 of hydraulic return flow damper 11 integrated in master brake cylinder piston 5 moves with the one master brake cylinder piston 5, whereas the stationary further master brake cylinder piston 7 prevents return flow damper piston 13 from moving along with it, via piston rod 15 fastened to this piston 7. Return flow damper piston 13 is connected, via piston rod 15, to further master brake cylinder piston 7, and via this piston is connected to master brake cylinder 1. Return flow damper piston 13, held immovable, moves relative to the two chambers 18, 19 in return flow damper cylinder 12, causing the volume of the one chamber 18 to become larger and causing the volume of the other chamber 19 to become smaller by the same amount. Here, blocking element 21 of first check valve 22 is lifted off from openings 20 in return flow damper piston 13, and brake fluid flows from the other chamber 19, which is becoming smaller, into the one chamber 18, which is becoming larger, of return flow damper 11.

If the foot brake pedal is released, and as a result master brake cylinder piston 5 moves opposite the direction of actuation back in the direction of an unactuated position, return flow damper piston 13 moves relative to return flow damper cylinder 12 in the direction opposite to that during actuation, causing the volume of the one chamber 18 to become smaller and causing the volume of the other chamber 19 to become larger. However, first check valve 22 on return flow damper piston 13 blocks a flow of brake fluid from the one chamber 18 back into the other chamber 19, so that the brake fluid has to flow through the spring-loaded second check valve 23, acting as a dynamic throttle, from the one chamber 18 of return flow damper cylinder 12, whose volume becomes smaller during the return movement of master brake cylinder 5 into master brake cylinder bore 3. Brake fluid flows through radial bores 27 from master brake cylinder bore 3 into the other chamber 19 of return flow damper cylinder 12, the volume of which chamber becomes larger during the return movement of master brake cylinder piston 5. The flow of brake fluid, during the return movement of master brake cylinder piston 5, from the one chamber 18 of return flow damper cylinder 12 through second check valve 23 dampens the return movement of master brake cylinder piston 5. In particular when there is a sudden release of the brake foot pedal, for example when the driver's foot slips off the brake pedal, this prevents master brake cylinder piston 5 from making a hard impact against an end stop of master brake cylinder 1, which stop limits the return movement of master brake cylinder piston 5 and defines its unactuated position. As a result, damage to components, sensors, and electronics due to a hard impact of master brake cylinder piston 5 and a recoiling of master brake cylinder piston 5 are prevented, where the latter could cause a faulty controlling of the external force brake, because an electronic brake regulation system may falsely recognize a desire to brake on the part of the vehicle driver.

With wheel brake pressure modulation valve systems 29, in a known manner a wheel-individual wheel brake pressure regulation, and thus a slip regulation, is possible. This is known and is not further explained here.

When there is a failure of external force pressure producer 38, or a disturbance in the electronic brake regulation, an auxiliary braking takes place through actuation of master brake cylinder 1 by muscular force, in which separating valves 28 are opened and simulator valve 33 remains closed.

Hydraulic block 2, forming master brake cylinder 1, is provided for a hydraulic external force vehicle brake system having slip regulation. Separating valves 28, simulator valve 33, and valves of the wheel brake pressure modulation valve systems 29 are magnetic valves that, like cylinder-piston unit 35 of external force pressure producer 38 and pedal path simulator 34, are situated in receptacles in hydraulic block 2 and are connected to one another through a bore in hydraulic block 2, i.e. are connected to one another corresponding to a hydraulic circuit plan of the slip regulation. Electric motor 36 of external force pressure producer 38 is situated externally, which may be on one of the large sides of hydraulic block 2. Magnetic valves, external force pressure producer 38, and pedal path simulator 34 can generally also be understood as hydraulic components of the slip regulation system. Hydraulic block 2 forms, as stated, master brake cylinder 1 according to the present invention, and, when equipped with the named hydraulic components, forms a hydraulic aggregate that is, or in any case is a core part of, the external force brake regulation and the slip regulation of the vehicle brake system. Slip regulation systems such as anti-lock systems, anti-slip systems, and driving dynamic regulation systems, or electronic stability programs, standardly abbreviated ABS, ASR, FDR, or ESP, are known to those skilled in the art, as are their hydraulic blocks, and are therefore not explained here in more detail.

What is claimed is:

1. A master brake cylinder for a hydraulic vehicle brake system, comprising:
   a master brake cylinder bore, in which a first master brake cylinder piston is axially displaceable;
   a hydraulic return flow damper that dampens a return movement of the first master brake cylinder piston in a direction of an unactuated position in the master brake cylinder bore, wherein the return flow damper has a return flow damper cylinder and a return flow damper piston that divides the return flow damper cylinder into two chambers;
   wherein one of the return flow damper cylinder or the return flow damper piston is connected to the first master brake cylinder piston, and wherein another one of the return flow damper piston or the return flow damper cylinder is connected to the master brake cylinder or to a further master brake cylinder piston, so that a displacement of the first master brake cylinder piston in the master brake cylinder displaces the return flow damper piston in the return flow damper cylinder, so that volumes of the two chambers in the return flow damper cylinder change in opposite directions, and
   wherein the return flow damper includes a first check valve through which brake fluid can flow from one of the two chambers, whose volume becomes smaller when there is a displacement of the first master brake cylinder piston in the master brake cylinder in a direction of actuation, into another of the two chambers, and wherein one of the two chambers has a spring-loaded second check valve through which brake fluid can flow from the one chamber into the master brake cylinder and that acts as a throttle in a direction of flow.

2. The master brake cylinder of claim 1, wherein a flow cross-section of the first check valve is greater than a flow cross-section of the second check valve.

3. The master brake cylinder of claim 1, wherein the second check valve includes a flutter valve.

4. The master brake cylinder of claim 3, wherein the flutter valve has a leaf spring as blocking element and valve closing spring, and an opening pressure of the flutter valve is defined by a bending rigidity, a pre-tension, and a distance of a fastening of the leaf spring forming the valve closing spring from a valve opening.

5. The master brake cylinder of claim 1, wherein the second check valve includes an elastic perforated disk as a blocking element and valve closing spring, which is situated on an end wall of the return flow damper cylinder, covers a valve opening in the end wall, and is fastened on the end wall at a distance from the valve opening.

6. The master brake cylinder of claim 5, wherein the distance of the fastening of the perforated disk forming the valve closing spring from the valve opening sets an opening pressure of the second check valve.

7. The master brake cylinder of claim 5, wherein the blocking element has a raised part, on a side facing the end wall of the return flow damper cylinder, that, when the second check valve is closed, lies against a valve seat of the second check valve on the end wall of the return flow damper cylinder.

8. The master brake cylinder of claim 1, wherein the first master brake cylinder piston is a hollow piston in which the return flow damper cylinder is situated.

9. The master brake cylinder of claim 1, wherein the master brake cylinder includes a hydraulic block of a hydraulic vehicle brake system having receptacles for hydraulic components of a brake regulation system of the hydraulic vehicle brake system and having connections for wheel brakes of the hydraulic vehicle brake system.

* * * * *